(12) United States Patent
Menjo et al.

(10) Patent No.: US 7,949,349 B2
(45) Date of Patent: May 24, 2011

(54) MOBILE COMMUNICATION TERMINAL AND POSITIONAL INFORMATION PROVIDING METHOD

(75) Inventors: Hiroyuki Menjo, Mito (JP); Manabu Fujita, Nagareyama (JP); Aki Kariya, Ichikawa (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 808 days.

(21) Appl. No.: 10/574,225

(22) PCT Filed: Oct. 1, 2004

(86) PCT No.: PCT/JP2004/014504
§ 371 (c)(1),
(2), (4) Date: Dec. 13, 2006

(87) PCT Pub. No.: WO2005/034563
PCT Pub. Date: Apr. 14, 2005

(65) Prior Publication Data
US 2007/0123269 A1    May 31, 2007

(30) Foreign Application Priority Data
Oct. 3, 2003   (JP) ................................ 2003-346197

(51) Int. Cl.
*H04W 24/00* (2009.01)
*H04M 11/04* (2006.01)
*H04M 3/42* (2006.01)
*H04M 3/493* (2006.01)
*H04L 29/06* (2006.01)
*G08G 1/123* (2006.01)
*G01S 3/02* (2006.01)

(52) U.S. Cl. ............... 455/456.2; 455/456.1; 455/404.2; 455/414.2; 455/414.3; 340/988; 342/457

(58) Field of Classification Search ............... 455/404.2, 455/456.1–456.2, 414.2–414.3; 340/988; 342/457
See application file for complete search history.

(56) References Cited

U.S. PATENT DOCUMENTS

| | | | |
|---|---|---|---|
| 6,580,916 B1 | 6/2003 | Weisshaar et al. | |
| 6,856,807 B1 * | 2/2005 | Raith | 455/456.1 |
| 6,876,858 B1 * | 4/2005 | Duvall et al. | 455/456.1 |
| 7,076,256 B1 * | 7/2006 | Orler et al. | 455/456.1 |
| 2002/0025824 A1 * | 2/2002 | Lin | 455/456 |
| 2005/0054352 A1 * | 3/2005 | Karaizman | 455/456.3 |
| 2005/0113113 A1 * | 5/2005 | Reed | 455/456.3 |

FOREIGN PATENT DOCUMENTS

| | | |
|---|---|---|
| JP | 8-322091 | 12/1996 |
| JP | 10-79700 | 3/1998 |
| JP | 10-304293 | 11/1998 |
| JP | 2002-357448 | 12/2002 |
| WO | WO 02/30005 A2 | 4/2002 |

\* cited by examiner

Primary Examiner — Huy Phan
Assistant Examiner — Munsoon Choo
(74) Attorney, Agent, or Firm — Oblon, Spivak, McClelland, Maier & Neustadt, L.L.P.

(57) ABSTRACT

An object is to provide a cell phone capable of achieving improvement in efficiency of communication and improvement in user's operability on the occasion of providing location information. A cell phone 10 has a data transmitter 101 for transmitting user data to a content delivery server 30, using a user channel, a location request part 102 for transmitting request information to request calculation of location information about the cell phone 10, to a GPS server 40 in accordance with the transmission of the user data, using a control channel, a location acquiring part 103 for acquiring the location information calculated based on the request information by the GPS server 40, using the control channel, and a location transmitter 105 for transmitting the location information to the content delivery server 30, using the control channel.

11 Claims, 4 Drawing Sheets

*Fig.2*

| ACQUISITION TIME INFORMATION | LOCATION INFORMATION (LONGITUDE, LATITUDE) |
|---|---|
| 2003/8/1 10:14:15 | (139° 46′ 20″ , 35° 41′ 18″) |
| 2003/8/1 10:13:15 | (139° 46′ 05″ , 35° 41′ 14″) |
| 2003/8/1 10:12:15 | (139° 46′ 05″ , 35° 41′ 14″) |
| ⋮ | ⋮ |

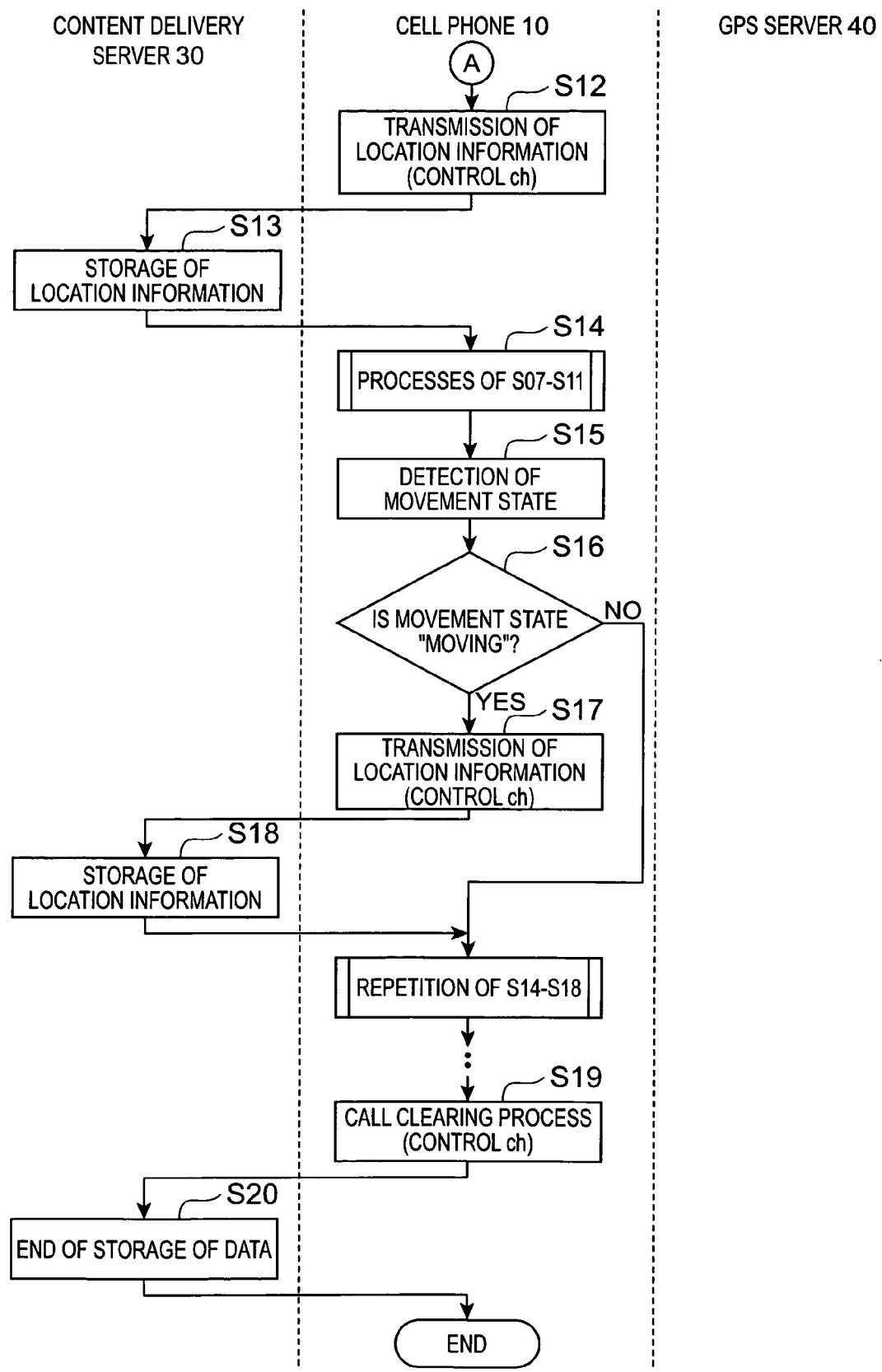

MOBILE COMMUNICATION TERMINAL AND POSITIONAL INFORMATION PROVIDING METHOD

TECHNICAL FIELD

The present invention relates to a portable communication terminal and a location information providing method.

BACKGROUND ART

It is common practice to provide location information of a portable communication terminal, as an information delivery service in a mobile communication network. This location information is acquired by transmitting a request from the portable communication terminal to a location information calculating server to calculate or manage the location information about the portable communication terminal.

In mobile communication, transmission/reception of data between the portable communication terminal and a communication partner equipment such as a content server is performed using a user channel such as a speech channel, while transmission/reception of control data for controlling communication on the user channel is performed using a control channel different from the user channel (e.g., reference is made to Patent Document 1). The foregoing transmission/reception of the location information between the portable communication terminal and the location information calculating server is also carried out similarly using the user channel.

Patent Document 1: Japanese Patent Application Laid-Open No. 10-79700

DISCLOSURE OF THE INVENTION

Problem to be Solved by the Invention

In the above-described conventional technology, however, the user channel is occupied during the acquisition of the location information by the portable communication terminal, and therefore user data such as image data or character data cannot be transmitted from the portable communication terminal during that period. Particularly, in a case where the location information, together with image data or voice data generated in real time with motion of a subject, is desired to be transmitted to the same destination, the total communication time will increase and a latency will be produced to degrade operability.

The present invention has been accomplished in view of the above problem and an object of the invention is to provide a portable communication terminal and a location information providing method capable of achieving improvement in efficiency of communication and improvement in user's operability on the occasion of providing the location information.

Means for Solving the Problem

A portable communication terminal of the present invention is a portable communication terminal comprising: data transmitting means for transmitting user data to a communication partner equipment, using a user channel for transmission of user data; location requesting means for transmitting request information to request calculation of location information about the host terminal, to a location information calculating server for calculating the location information, in accordance with the transmission of the user data, using a control channel for transmission of control data; location acquiring means for acquiring the location information calculated based on the request information in the location information calculating server, using the control channel; and location transmitting means for transmitting the acquired location information to the communication partner equipment, using the control channel.

A location information providing method of the present invention is a location information providing method for providing location information from a portable communication terminal to a communication partner equipment, comprising: a data transmission step wherein data transmitting means transmits user data to the communication partner equipment, using a user channel for transmission of user data; a location request step wherein location requesting means transmits request information to request calculation of location information about the host terminal, to a location information calculating server for calculating the location information, in accordance with the transmission of the user data, using a control channel for transmission of control data; a location acquisition step wherein location acquiring means acquires the location information calculated based on the request information in the location information calculating server, using the control channel; and a location transmission step wherein location transmitting means transmits the acquired location information to the communication partner equipment, using the control channel.

In the portable communication terminal and location information providing method of the present invention, the data transmitting means transmits the user data to the communication partner equipment, using the user channel, the location requesting means requests the location information calculating server to calculate the location information, in accordance with the transmission of the user data, using the control channel, the location acquiring means acquires the location information calculated in the location information calculating server, using the control channel, and the location transmitting means transmits the location information to the communication partner equipment, using the control channel; therefore, the location information about the portable communication terminal can be acquired in parallel with the transmission of the user data to the communication partner equipment, and the location information can be provided to the communication partner equipment.

In the portable communication terminal of the present invention, preferably, the location requesting means continues to transmit the request information at predetermined intervals while the data transmitting means transmits the user data. In this case, the location requesting means continues to request the calculation of the location information at the predetermined intervals in accordance with the transmission of the user data, and therefore the location information can be acquired and provided sequentially even in the case where the user of the portable communication terminal is in motion.

The portable communication terminal of the present invention is also preferably configured as follows: it further comprises movement detecting means for detecting a movement state of the location of the portable communication terminal, based on the location information acquired by the location acquiring means, and the location transmitting means transmits the location information in accordance with the detected movement state. In this case, the movement detecting means detects the movement state of the portable communication terminal and the location transmitting means transmits the location information according to the detected state thereof; therefore, efficiency of communication traffic can be improved, for example, by such an operation as to transmit the location information where the portable communication terminal is in the movement state.

In the portable communication terminal of the present invention, preferably, the user data is motion picture data taken as a picture of a subject and the data transmitting means transmits the taken motion picture data in real time. In this case, even during real-time transmission of motion picture data, e.g., during use of a TV telephone function, the location information can be provided to the communication partner equipment in parallel with the transmission of such motion picture data. In the portable communication terminal of the present invention, preferably, the request information contains a GPS signal transmitted from a GPS satellite.

EFFECT OF THE INVENTION

Since the portable communication terminal of the present invention is configured to transmit the user data to the communication partner equipment, using the user channel, to request the location information calculating server to calculate the location information, in accordance with the transmission of the user data, using the control channel, to acquire the location information calculated in the location information calculating server, using the control channel, and to transmit the location information to the communication partner equipment, using the control channel, the location information about the portable communication terminal can be acquired in parallel with the transmission of the user data to the communication partner equipment, and the location information can be provided to the communication partner equipment. As a result, the invention successfully substantializes the portable communication terminal capable of achieving improvement in efficiency of communication and improvement in user's operability on the occasion of providing the location information.

BRIEF DESCRIPTION OF THE DRAWINGS

FIG. 2 is a configuration diagram of data stored in a location information storage in FIG. 1.

FIG. 4 is a second flowchart showing an operation of a cell phone according to the present invention.

DESCRIPTION OF REFERENCE SYMBOLS 10 cell phone; 20 network; 30 content delivery server; 40 GPS server; 101 data transmitter; 102 location request part; 103 location acquiring part; 104 movement detector; 105 location transmitter; 106 camera; 107 GPS positioning part; 108 location information storage.

BEST MODE FOR CARRYING OUT THE INVENTION

A portable communication terminal as an embodiment of the present invention will be described with reference to the drawings. In each of the drawings the same elements will be denoted by the same reference symbols, without redundant description.

Figure 1:
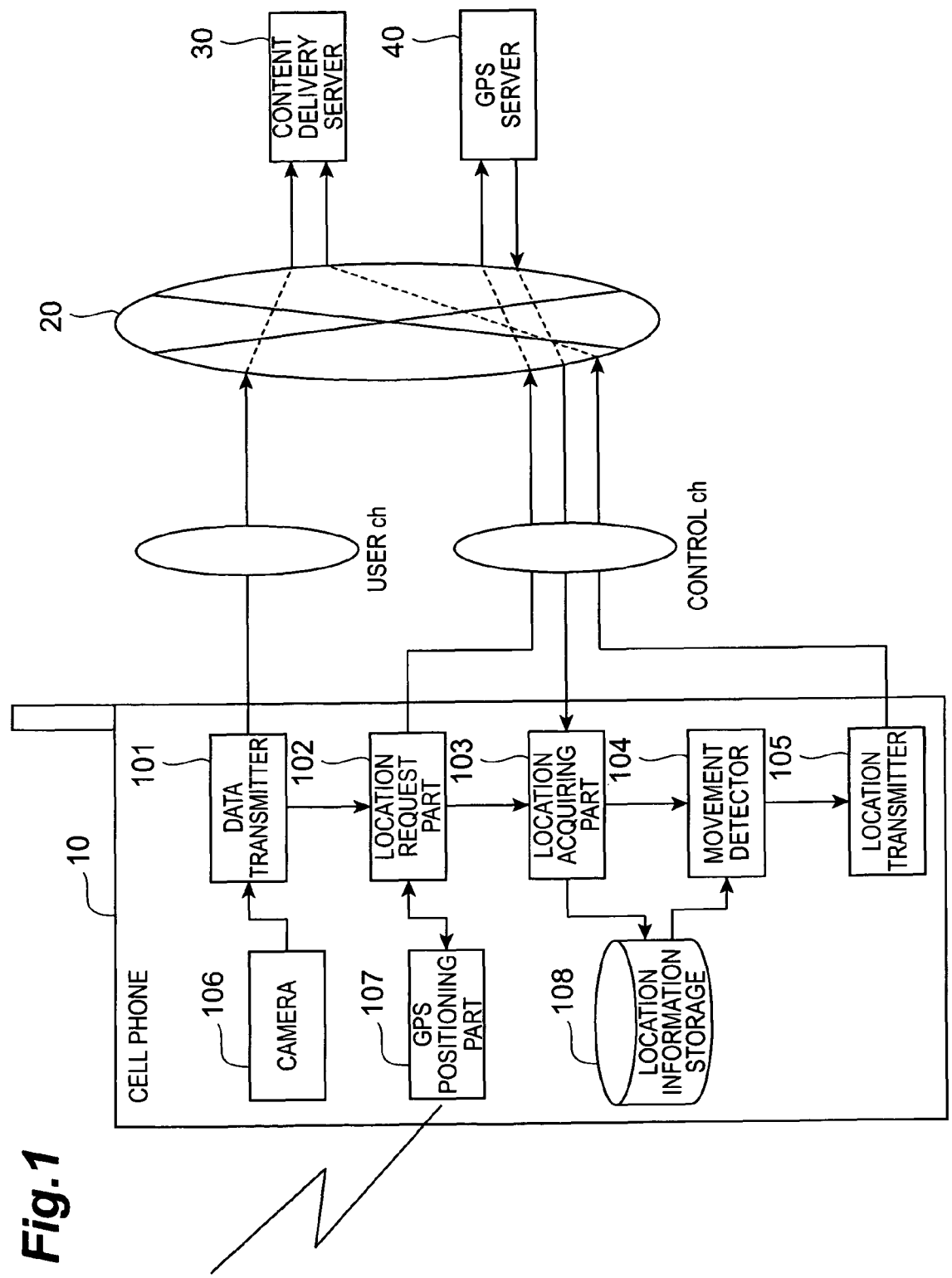
FIG. 1 is a configuration diagram of a cell phone being an embodiment of the present invention.

FIG. 1 is a configuration diagram of a cell phone being a portable communication terminal according to the present invention. As shown in FIG. 1, the cell phone 10 according to the present embodiment is constructed so as to be able to transmit and receive data through a network 20 to and from a content delivery server 30 (communication partner equipment) for delivering contents (user data) such as motion picture data, character data, or voice data and to and from a GPS server 40 (location information calculating server) for calculating location information of the cell phone 10.

The GPS server 40 is constructed as a computer system for calculating the location information of the cell phone 10, based on GPS signal information of locations, times, etc. of GPS satellites included in GPS signals received by the cell phone 10. The GPS server 40 has a function of calculating the location information about the cell phone 10 by converting the present location of the cell phone 10 to a longitude and latitude, based on the GPS signal information.

The content delivery server 30 is constructed as a computer system for receiving motion picture data as a content from cell phone 10, storing the data, and providing the motion picture data to a receiver terminal (not shown) such as another portable communication terminal or a personal computer. In addition, the content delivery server 30 also has a function of receiving the location information about cell phone 10, together with the motion picture data from cell phone 10, and storing the location information in association with the content in an information storage (not shown) such as a hard disk. This enables the server to provide the motion picture data and location information together to the receiver terminal on the occasion of providing the content.

The cell phone 10 is a cell phone used by a user and terminal capable of performing a voice speech through network 20 and transmitting and receiving data such as the motion picture data. Therefore, the cell phone 10 is physically constructed as a computer system having a CPU (central processing unit), a RAM (main memory), a flash memory, a frequency conversion chip, a power amplifier, an analog-digital conversion chip, input devices such as buttons and camera 106, a display device such as a display, and a GPS positioning part 107 for receiving the GPS signals. The cell phone 10 has a function of transmitting the location information about the cell phone 10, together with the motion picture data, to the content delivery server 30.

The cell phone 10 includes functional components of data transmitter 101 (data transmitting means), location request part 102 (location requesting means), location acquiring part 103 (location acquiring means), movement detector 104 (movement detecting means), location transmitter 105 (location transmitting means), and location information storage 108. Each of the components will be described below in detail.

The data transmitter 101 is a part that transmits motion picture data generated by photographing a subject such as a person or scenery with the camera 106, in real time to the content delivery server 30. The transmission of motion picture data is performed using a user ch (user channel) for transmission of user data such as motion picture data.

The location request part 102 is a part that transmits request information to request calculation of the location information about the host cell phone 10, to the GPS server 40 during transmission of the motion picture data, in accordance with the transmission of the motion picture data by the data transmitter 101. This transmission of the request information is carried out using a control ch (control channel) for transmission of control data such as a control signal for call connection. This request information contains the GPS signal information of locations, times, etc. of GPS satellites included in the GPS signals received by the GPS positioning part 107, as basic data for calculation of the location information. The location request part 102 has a function of continuing to transmit the request information at predetermined intervals by use of the control ch while the data transmitter 101 transmits the motion picture data in the user ch.

The GPS positioning part 107 is a part that receives GPS signals from GPS satellites. The GPS positioning part 107 outputs the GPS signal information included in the GPS signals as described above, to the location request part 102.

The location acquiring part 103 is a part that acquires the location information about cell phone 10 calculated based on the request information in the GPS server 40. The acquisition of the location information is carried out by receiving it through the use of the control ch from the GPS server 40. The location acquiring part 103 stores the acquired location information in association with an acquisition time in the location information storage 108 and outputs it to the movement detector 104. FIG. 2 shows an example of a configuration diagram of data stored in this manner in the location information storage 108. As shown in FIG. 2, the location information "(139°46'20", 35°41'18")" acquired by the location acquiring part 103, is stored in association with the acquisition time "2003/8/1 10:14:15." The example of FIG. 2 shows a case where the location request part 102 transmits the request information in 1-min cycles to the GPS server 40.

The movement detector 104 is a part that detects whether a movement state of the location of cell phone 10 is "moving" or "still," based on the location information outputted from the location acquiring part 103 and the past location information stored in the location information storage 108. The detection of the movement state is carried out as follows: the location information outputted from the location acquiring part 103 is compared with the location information acquired last by the location acquiring part 103 and, when they disagree, the movement state is detected as "moving." On the other hand, when they agree, the movement state is detected as "still." For example, in the case of the example of FIG. 2, the location information "(139°46'20", 35°41'18")" outputted from the location acquiring part 103 disagrees with the location information "(139°46'05", 35°41'14")" acquired at the previous acquisition time "2003/8/1 10:13:15," and thus the movement state is detected as "moving." The movement detector 104 outputs the current location information and movement state to the location transmitter 105.

The location transmitter 105 is a part that transmits the location information of cell phone 10 to the content delivery server 30 in accordance with the movement state detected by the movement detector 104. Specifically, when the movement state is "moving," the location transmitter 105 transmits the location information outputted from the movement detector 104, using the control ch. On the other hand, when the movement state is "still," the location transmitter 105 does not carry out the above transmission.

Figure 3:
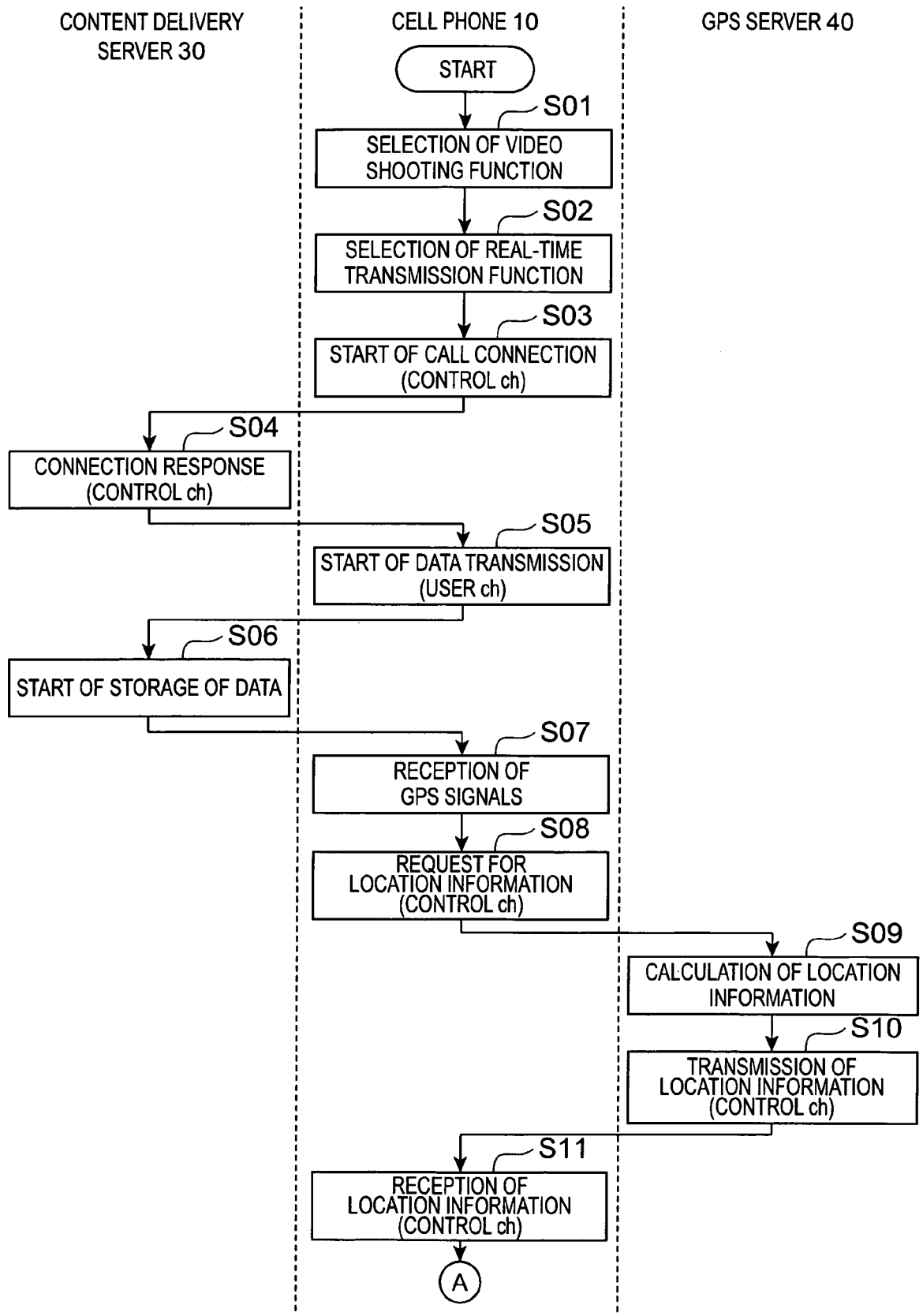
FIG. 3 is a first flowchart showing an operation of a cell phone according to the present invention.

Subsequently, an operation of cell phone 10 according to the present embodiment will be described, together with a location information providing method according to an embodiment of the present invention. FIGS. 3 and 4 depict a flowchart showing the operation of cell phone 10 according to the present embodiment.

First, with reference to FIG. 3, the user of cell phone 10 manipulates the cell phone to select a motion picture shooting function (step S01). When the user selects a real-time transmission function in the motion picture shooting function, motion picture data taken from a subject with the camera 106 is sequentially transferred to the data transmitter 101 (step S02).

Then the cell phone 10 transmits a control signal for call connection through the use of the control ch to the content delivery server 30 (step S03). In response to it, the content delivery server 30 sends a connection response signal back to the cell phone 10, using the control ch, to establish a connection (step S04). Thereafter, the data transmitter 101 transmits the motion picture data in real time to the content delivery server 30, using the user ch (step S05). Every time the content delivery server 30 receives motion picture data, the received data is stored in the information storage of the content delivery server 30 (step S06).

While the motion picture data is transmitted to the content delivery server 30 in this manner, the GPS positioning part 107 receives GPS signals (step S07). The location request part 102 puts the GPS signal information in the received GPS signals, into the request information and transmits it to the GPS server 40, using the control ch (step S08). When the GPS server 40 receives the request information, it calculates the location information of cell phone 10, based on the GPS signal information (step S09). The calculated location information is transmitted to the cell phone 10, using the control ch (step S10).

The location acquiring part 103 of cell phone 10 receives the location information transmitted from the GPS server 40 (step S11). Next, with reference to FIG. 4, the location transmitter 105 of cell phone 10 transmits the location information to the content delivery server 30, using the control ch (step S12). When the content delivery server 30 receives the location information, it is stored together with the motion picture data simultaneously transmitted from the cell phone 10, in the information storage (step S13).

After a lapse of a predetermined time from the previous transmission of the request information from cell phone 10 to GPS server 40, the processes of step S07 to step S11 are then repeated, whereby the location acquiring part 103 receives new location information (step S14). Then the movement detector 104 detects the movement state of location of cell phone 10 on the basis of the currently received location information and the previously received location information (step S15). Next, the location transmitter 105 determines whether the movement state is "moving" (step S16). When the result of the determination is that the movement state is "moving" (step S16; YES), the location transmitter 105 transmits the current location information to the content delivery server 30, using the control ch (step S17). The transmitted location information is received by the content delivery server 30 to be stored together with the motion picture data in the information storage (step S18). On the other hand, when the movement state is determined not to be "moving" (step S16; NO), the processes of steps S17-S18 are skipped.

Thereafter, the transmission of request information from cell phone 10 to GPS server 40 is continuously repeated at intervals of the predetermined time to repeatedly carry out the processes of step S14 to step S18 before a call clearing process is performed.

Finally, an operation for call clearing is carried out, whereupon the cell phone 10 transmits a control signal for call clearing to the content delivery server 30, using the control ch (step S19). When the content delivery server 30 receives this control signal, the storage of motion picture data is terminated (step S20).

Since the cell phone 10 of the present embodiment described above is constructed in the configuration wherein the data transmitter 101 transmits the user data to the content delivery server 30, using the user ch, the location request part 102 requests the GPS server 40 to calculate the location information, according to the transmission of the user data, using the control ch, the location acquiring part 103 acquires the location information calculated in the GPS server 40, using the control ch, and the location transmitter 105 transmits the location information to the content delivery server 30, using the control ch, the location information about cell phone 10 can be acquired in parallel with the transmission of the user data to the content delivery server 30, and the location information can be provided to the content delivery server 30.

The communication partner equipment with the cell phone 10 in the present embodiment was the content delivery server 30, but the communication partner equipment may also be a cell phone of another user, a personal computer, a PDA (Personal Digital Assistant), a PHS (Personal Handyphone System), or the like. This enables the cell phone to transmit the motion picture data and location information together to the partner during use of the TV telephone function, for example.

In the cell phone 10 of the present embodiment, the GPS server 40 calculated and used the longitude information and latitude information as the location information of the cell phone 10, but address information or map information may also be generated and used as the location information.

In the cell phone 10 according to the present embodiment, the GPS signals were used as the basic data for calculation of the location information, but base station specific information to specify a base station covering an area in which the cell phone 10 is located may also be used as the basic data.

In the cell phone 10 according to the present embodiment, the motion picture data was the intended user data to be transmitted to the content delivery server, but the intended user data may be any other data of another data format such as character data or voice data.

In the case of the cell phone 10 according to the present embodiment, the portable communication terminal was the cell phone, but it may also be a potable personal computer, a personal digital assistant (PDA), a PHS (Personal Handyphone system), or the like.

The invention claimed is:

1. A system comprising:
   a communication partner equipment;
   a portable communication terminal communicatively coupled to the communication partner equipment,
   the portable communication terminal including,
      data transmitting means for transmitting picture data from the portable communication terminal to a communication partner equipment, using a user channel for transmission of picture data,
      location requesting means for transmitting request information to request calculation of location information about the portable communication terminal, the request information being transmitted from the portable communication terminal to a location information calculating server for calculating the location information over a control channel for transmission of control data, wherein the communication partner equipment is not part of the location information calculating server,
      location acquiring means for acquiring, at the portable communication device, the location information over the control channel from the location information calculating server in parallel with the data transmitting means transmitting the picture data to the communication partner over the user channel, the location information having been calculated based on the request information in the location information calculating server, and
      location transmitting means for transmitting, from the portable communication device over the control channel, the location information acquired by the location acquiring means from the location information calculating server to the communication partner equipment in parallel with the data transmitting means transmitting the picture data to the communication partner over the user channel; and
   the communication partner equipment stores the picture data in association with the location information received from the location transmitting means of the portable communication device, and the communication partner equipment transmits the picture data together with the location information to a receiver terminal.

2. The system according to claim 1, wherein the location requesting means continues to transmit the request information at predetermined intervals while the data transmitting means transmits the picture data.

3. The system according to claim 2, wherein the portable communication terminal further comprises:
   movement detecting means for detecting a movement state of the location of the portable communication terminal, based on the location information acquired by the location acquiring means,
   wherein the location transmitting means transmits the location information in accordance with the detected movement state.

4. The system according to any one of claims 1 to 3, wherein the picture data is motion picture data taken as a picture of a subject and the data transmitting means transmits the taken motion picture data in real time.

5. The system according to any one of claims 1 to 3, wherein the request information contains a GPS signal transmitted from a GPS satellite.

6. A location information providing method for providing location information from a portable communication terminal to a communication partner equipment, comprising:
   transmitting, with a transmitter of the portable communication terminal, picture data to the communication partner equipment over a user channel for transmission of picture data;
   transmitting request information to request calculation of location information about the portable communication terminal, the request information being transmitted from the portable communication terminal to a location information calculating server for calculating the location information over a control channel for transmission of control data, wherein the communication partner equipment is not part of the location information calculating server;
   acquiring, at the portable communication terminal, the location information over the control channel from the location information calculating server in parallel with transmitting the picture data to the communication partner over the user channel, the location information having been calculated based on the request information in the location information calculating server;
   transmitting, from the portable communication device over the control channel, the location information acquired by the acquiring step from the location information calculating server to the communication partner equipment in parallel with transmitting the picture data to the communication partner over the user channel;
   storing, at the communication partner equipment, the picture data in association with the location information received from the portable communication device; and
   transmitting, at the communication partner equipment, the picture data together with the location information to a receiver terminal.

7. The system according to claim 4, wherein the request information contains a GPS signal transmitted from a GPS satellite.

8. A system comprising:

a communication partner equipment;

a portable communication terminal communicatively coupled to the communication partner equipment, the portable communication terminal including,

- a data transmitting unit configured to transmit picture data from the portable communication terminal to a communication partner equipment, using a user channel for transmission of picture data,
- a location requesting unit configured to transmit request information to request calculation of location information about the portable communication terminal, the request information being transmitted from the portable communication terminal to a location information calculating server for calculating the location information using a control channel for transmission of control data, wherein the communication partner equipment is not part of the location information calculating server,
- a location acquiring unit configured to acquire, at the portable communication device, the location information over the control channel from the location information calculating server in parallel with the data transmitting unit transmitting the picture data to the communication partner over the user channel, the location information having been calculated based on the request information in the location information calculating server, and
- a location transmitting unit configured to transmit, from the portable communication device over the control channel, the location information acquired by the location acquiring unit from the location information calculating server to the communication partner equipment in parallel with the data transmitting unit transmitting the picture data to the communication partner over the user channel; and the communication partner equipment stores the picture data in association with the location information received from the location transmitting means of the portable communication device, and the communication partner equipment transmits the picture data together with the location information to a receiver terminal.

9. The system of claim 1, wherein the picture data is motion picture data.

10. The system of claim 8, wherein the picture data is motion picture data.

11. The method of claim 6, wherein the picture data is motion picture data.

* * * * *